United States Patent [19]
Broszat et al.

[11] Patent Number: 4,902,158
[45] Date of Patent: Feb. 20, 1990

[54] ASSEMBLY OF A BALL JOINT SHANK AND A TUBE

[75] Inventors: Lothar Broszat, Monheim; Andreas Merklinger, Krefeld; Fritz Busse, Hilden, all of Fed. Rep. of Germany

[73] Assignee: TRW Ehrenreich GmbH & Co., Dusseldorf, Fed. Rep. of Germany

[21] Appl. No.: 271,007

[22] Filed: Nov. 14, 1988

[30] Foreign Application Priority Data

Nov. 12, 1987 [DE] Fed. Rep. of Germany ....... 3738432

[51] Int. Cl.$^4$ ............................................. F16C 11/00
[52] U.S. Cl. ..................................... 403/77; 403/290; 403/307
[58] Field of Search ................. 403/77, 309, 307, 118, 403/290

[56] References Cited

U.S. PATENT DOCUMENTS

| 2,227,648 | 1/1941 | Hufferd | 403/309 |
| 2,340,300 | 2/1944 | Booth et al. | |
| 3,938,822 | 2/1976 | Guerriero | 403/77 X |
| 4,657,424 | 4/1987 | Dong | 403/77 X |

FOREIGN PATENT DOCUMENTS

| 0222502 | 5/1987 | European Pat. Off. |
| 1937876 | 2/1970 | Fed. Rep. of Germany . |
| 8602266 | 4/1986 | Fed. Rep. of Germany . |
| 2171721 | 9/1973 | France . |
| 485267 | 5/1938 | United Kingdom . |
| 733343 | 7/1955 | United Kingdom . |
| 764881 | 1/1957 | United Kingdom . |

OTHER PUBLICATIONS

J. Reimpell, Fahrwerktechnik (Vehicle Technology), Vogel Book Publishers, Wurzburg, p. 271.

Primary Examiner—Andrew V. Kundrat
Attorney, Agent, or Firm—Tarolli, Sundheim & Covell

[57] ABSTRACT

An assembly for use especially as track and tie rods of motor vehicles, comprising a ball joint shank (3) and a tube (1) the ball joint shank (3) having an outer thread (4) which is received in an inner thread (2) of the tube (1), and clamping means located in the zone of the inner thread (2) for securing the ball joint shank and applying a force acting circumferentially of the tube (1). Assembling of the shank with the tube is simplified. In particular, simple sealing and connection with many different tubes is possible. To this end, the tube comprises a fold (5) extending radially outward and having side walls (6) which can be clamped together by at least one fastener (8) to secure the ball joint shank (3).

12 Claims, 4 Drawing Sheets

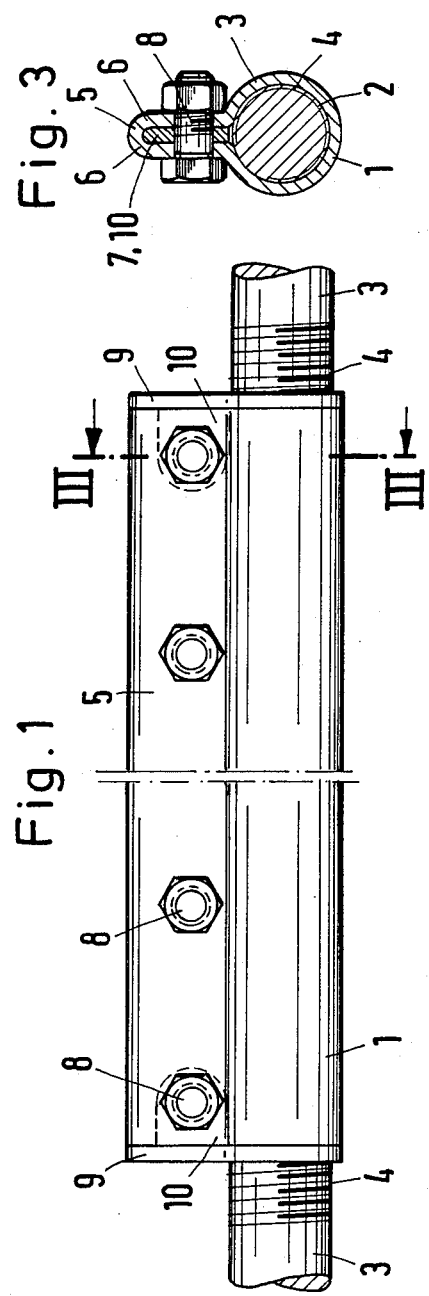

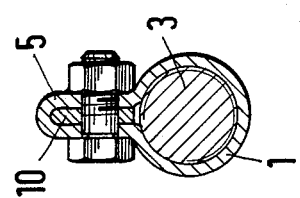
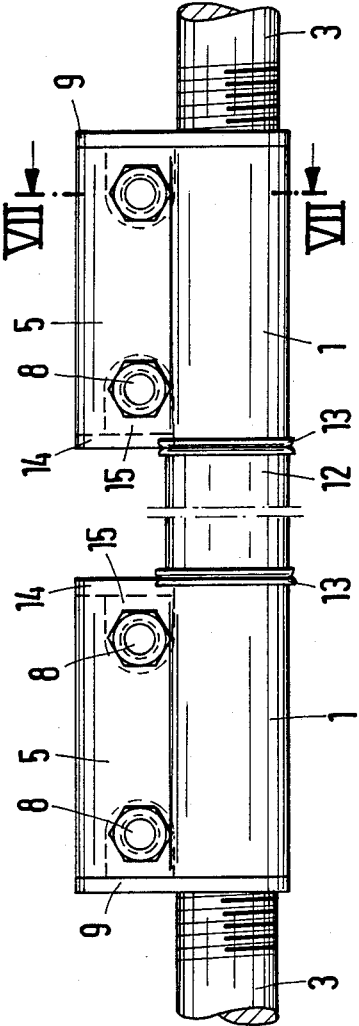
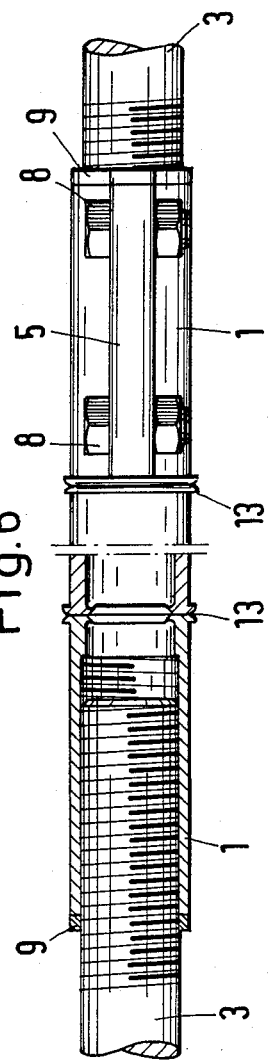

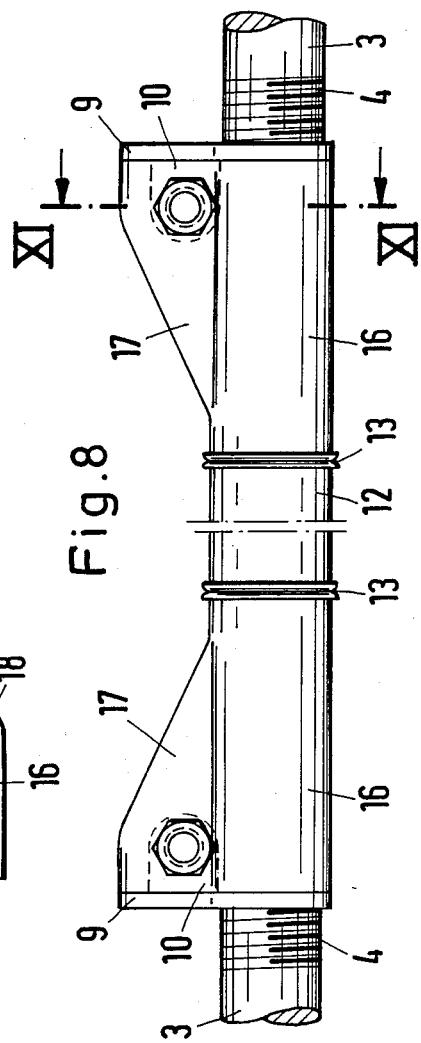

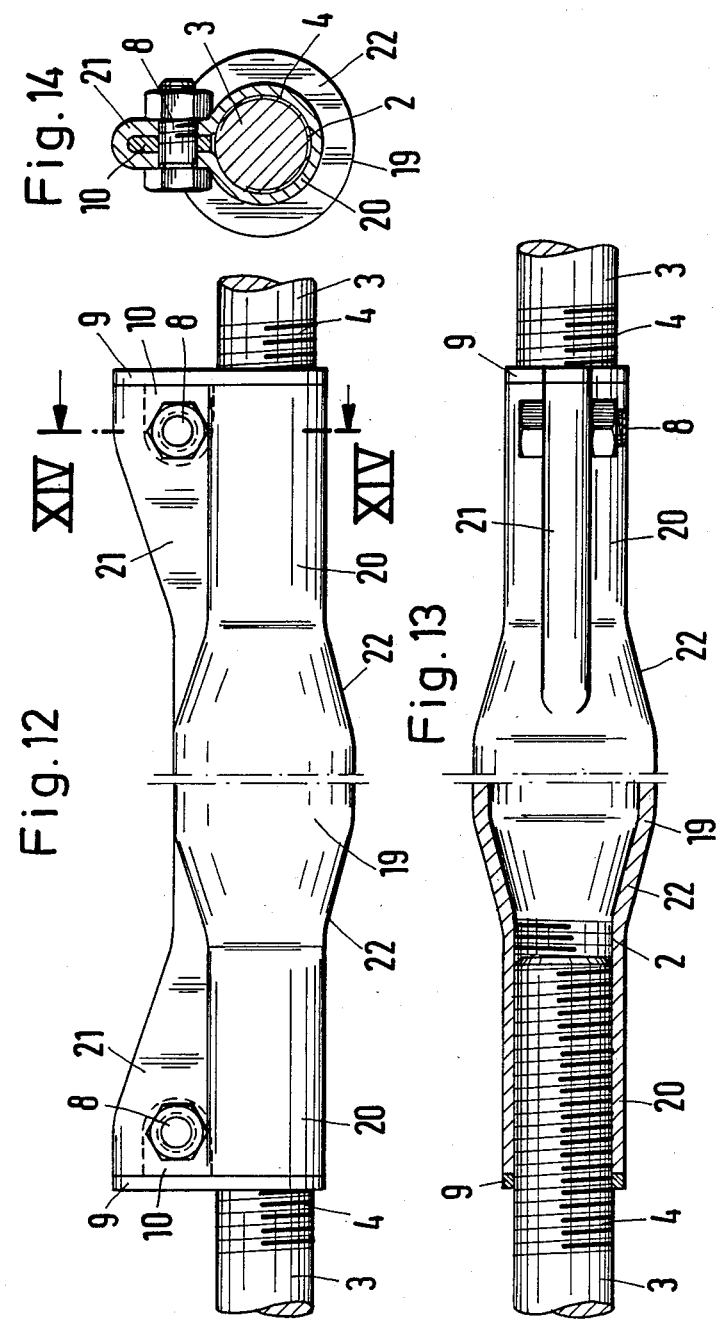

ASSEMBLY OF A BALL JOINT SHANK AND A TUBE

The invention relates to the connector of a ball joint shank with a tube, which forms a track or tie rod of a motor vehicle. The ball joint shank has an outer thread screwed into an inner thread of the tube and is secured therein by clamping means which applies a clamping force acting circumferentially of the tube in the zone of the inner threads. The clamping means comprises two radial projections on the tube and at least one fastener extending through the projections for clamping them together.

The manual of J. Reimpell, Fahrwerktechnik 1. (Vehicle Technology), Vogel book publishers, Wurzburg, Page 271, discloses an assembly comprising a tube with an inner thread and a ball joint having a threaded shank and in which the tube has a slot and is clamped by a clamping collar pushed over the tube. The collar has angularly extending clamping flanges which can be brought together by fasteners extending therethrough. This technique is rather inconvenient, because the collar and the fastener head must be held fast while a nut is tightened on the fastener. Moreover, the cost and weight of such an assembly are relatively large because of an additional element (the collar). Finally, the assembly is susceptible to corrosion since moisture can penetrate unhindered into threaded zones.

British Patent 764,881 discloses an assembly of a ball joint shank with a tube secured by clamping of tube flanges located on both sides of a tube slit, by fasteners. However, through the tube slit, impurities and moisture can penetrate into the threaded zone and cause malfunctioning as well as corrosion. Also, the tightening torque is hard to determine because the flanges can be brought together in abutting engagement so that the circumferential force would act directly on the ball joint shank. Also, a considerable force might be applied to the flanges and cause their abrasion. Since practically no strain paths are provided, additional locking washers must be used. Finally, the slit diminishes the strength of the assembly because high tension peaks occur, especially in the slit end zone.

Accordingly, the object of the invention is to improve the connection of a ball joint shank and a tube, especially to simplify assembling, to provide simple sealing, and to make possible a connection with many different tubes.

The object of the invention is achieved by providing a connection in which the collar is formed by side walls of a tube fold extending radially outward and closed at the end of the fold.

In an assembly according to the invention, the ball joint shank is screwed into the tube and is secured therein by bringing the tube together circumferentially in the zone of the fold. The folds provide space for deformation of tube material and reduce resistance in the circumferential direction to closing of the tube. To this extent, the folds assume the function of the collars described in the prior art between which a continuous tube slit is formed.

The advantage of the invention consists in that the tube even in the zone of the fold, is completely closed circumferentially. This substantially protects the threads of the ball joint shank and the tube against corrosion. Moreover, assembly is also facilitated since the side walls of the fold which merge into each other are drawn to each other only gradually by tightening of the screws so that the circumferential force acting on the ball joint shanks rises gradually. The tightening torque of the screws and the circumferential force acting on the ball joint shank can, thus, be determined very precisely, and the parts of the assembly are protected from an overload by clamping forces which are too large. Moreover, the tubular unit can be used with different tubular track or tie rods. The completely closed tube cross-section facilitates, for example, a weld connection with a track or tie rod. Finally, the assembly according to the invention is characterized by good strength, because it has a completely closed, unslitted tube wall. The resistance moment of the tube is, therefore, especially large. Also, the stress concentration, by local tension peaks, occurring at the slit end of slit tubes, is absent in the assembly according to the invention. This further increases the strength.

In accordance with one feature of the invention, the fold extends to the ball joint shank end of the tube. This facilitates, in particular, clamping of the side walls of the fold. Also, it makes possible sealing of an end of the tube and the open end of the fold with a common sealing element. Finally, this embodiment also offers advantages in production.

In accordance with another feature of the invention, a continuous shaped tube forms a track or tie rod. Here, especially, good strength values are attained. Also, to seal the track or tie rod, only two seals, at the two ends, are needed. Finally, the track or tie rod can be simply made from a drawn tube.

In another embodiment, tubes with a performed fold are welded to opposite ends of an intermediate tubular member with which they form commonly a track or tie rod. This embodiment provides for reducing the weight and the consumption of a material.

In another embodiment, the two ends of a tubular track or tie rod are formed, in each case, as a tube with a performed fold. This permits, in particular, to eliminate weld connections. If the intermediate tubular element of the track or tie rod has a diameter which is greater than the diameter of the rod ends, which are formed as tubes with performed folds, the manufacture is simplified, and a track or tie rod with relatively uniform strength values is provided.

In another embodiment, the radial dimension of a fold increases toward the ball joint shank end of a respective tube. This permits further reduction in weight and the production of tubes by deep drawing is facilitated. Seal material is saved also, since the folds have, in each case, only one open end.

In accordance with a particular feature of the present invention, the inner threads at the ends of track and tie rods are formed as right and left threads so that the track can be adjusted by rotating the track or tie rod.

In accordance with yet another feature of the present invention, the ball joint shank ends of each tube and the open ends of each fold are sealed by sealing rings preset or installed into tube expansions. This prevents corrosion of the track or tie rod during exploitation and facilitates its adjustment. It is especially advantageous if the sealing rings comprise tongues that extend into the folds and the fasteners used for connecting the ball joint shank with the tube end, extend through bores of the tongue. In this way, on one hand, the sealing rings are fastened and, on the other hand, the passage openings of the fasteners are sealed. At the same time, a certain protection of screw threads against corrosion is also attained.

Other details and advantages of the subject invention will become apparent from the description which follows with reference to respective drawings which show four preferred embodiments of an assembly according to the invention.

FIG. 1 is a frontal view of an assembly for a track or tie rod formed as a continuous tube;

FIG. 2 is a combination view of the same assembly wherein the left half represents the cross-section and the right half represents the top view of the assembly;

FIG. 3 is a cross-section along the line III—III in FIG. 1 of the same assembly;

FIG. 4 is a partial cross-section of another form of sealing of an end of a tube;

FIG. 5 is a frontal view of an assembly wherein the end tubes are welded to an intermediate tubular member;

FIG. 6 is a combination view of the same assembly wherein the left half represents the cross-section and the right half represents the top view of the assembly;

FIG. 7 is a cross-section along the line VII—VII of FIG. 5;

FIG. 8 is a frontal view of an assembly in which the radial extension of the fold increases toward the ball joint shank end of the tube;

FIG. 9 is a frontal view of a blank of the end tube;

FIG. 10 is a combination view of the same assembly wherein the left half represents the cross-section and the right half represents the top view of the assembly;

FIG. 11 is a cross-section of the same assembly along the line XI—XI of FIG. 8;

FIG. 12 is a frontal view of an assembly having a greater diameter in the middle zone than in the end zones;

FIG. 13 is a combination view of the same assembly wherein the left half represents the cross-section and the right half represents the top view of the assembly;

FIG. 14 is a cross-sectional view of the same assembly along the line XIV—XIV of FIG. 12.

In an assembly according to FIGS. 1 to 3, a tube 1 is a continuous shaped tube used as a track or tie rod. At the ends, the tube 1 has inner threads 2. Ball joint shanks 3 having outer threads 4 are threaded into the inner threads 2 of the tube 1.

The tube 1 is formed with a fold 5, extending radially outward. The side walls 6 of the fold form a clearance 7 which also interrupts the inner threads 2. The side walls 6 are clamped together by fasteners 8. In this way, the tube 1 is brought together at its circumference to secure a ball joint shank screwed therein.

The ball stud ends of the tube 1 and the open ends of the folds 5 are sealed by preset sealing rings 9. The sealing rings 9 comprise tongues 10 received in the clearance 7 of the fold 5. The fasteners 8 are inserted through bores of the tongues 10, so that the sealing rings 9 are held in place, and the fasteners 8 are also sealed off.

As shown in FIG. 4, the tube 1 may be provided at each end with a tube expansion 11 for receiving and securing the sealing ring which is located between the expansions 11 and ball joint shank 3. It is also convenient to provide the end openings of the fold 5 with expansions for receiving the sealing rings 9.

FIGS. 5 to 7 show another embodiment of the assembly of a track or tie rod in which, short tubes 1 are butt-welded by friction welds 13 to a tubular intermediate member. The free ends of the tubes 1, again receive ball joint shanks 3. The shanks are secured to the tube by clamping the folds 5 with fasteners 8 that extend through the folds. The folds 5 are sealed now not only by the sealing rings 9 at the ends of the ball joints but also by sealing rings 14 at the ends of the folds 5 facing each other. These sealing rings 14 are also provided with tongues 15 which are located in the recess defined by the fold and through which tongues the fasteners 8 extend.

The tubes 1 and the folds 5 may also be provided at the ends with the expansions according to FIG. 4 to receive the sealing rings.

FIGS. 8, 10 and 11 show again a track or tie rod, which is formed by tubes 16 butt-welded by friction welds 13 to an intermediate tubular member 12. The tubes 16 have inner threads 2 for receiving threaded ball joint shanks 3 therein.

The tubes 16 have folds 17 with a radial extension increasing from the cylindrical surface of a tube 16 to a location just before a respective end of the tube. The tube 16, as shown in FIG. 9, is formed as a cup part the cap 18 of which is separated after its manufacture.

By bringing together side walls of the fold 17, in this assembly also, the screwed-in ball joint shanks 3 are secured to the tube. Sealing is effected again by sealing rings 9 provided with tongues 10. This embodiment requires only two sealing rings.

The track or tie rod according to FIGS. 12 to 14 is, again, made from a single tube. It has an intermediate portion 19 with a diameter larger than the diameter of its ends which are in a form of tubes 20 with folds 21. Continuous transition portions 22 are provided between the intermediate portion 19 and the end tubes 20.

The tubes 20 have, again, inner threads 2, for receiving the ball joint shanks 3 having outer threads 4. The ball joint shanks 3 are secured, again, in the tubes 20 by screws 8 extending through the folds 21 and clamping their side walls together.

The threaded assembly is sealed by the sealing rings 9 with tongues 10 as described above. The ends of the tubes and the openings of the folds may also be expanded. In all track or tie rods, there are provided oppositely directed inner threads for receiving two ball joint shanks. A readjustment is possible, therefore, simply by rotating the track or tie rod.

We claim:

1. An assembly especially for track and tie rods of motor vehicles, comprising a ball joint shank (3) and a tube (1, 16, 20), the ball joint shank (3) having an outer thread (4) to be screwed into an inner threaded portion (2) of the tube (1, 16, 20), and clamping means for securing the ball joint shank with the tube and acting circumferentially of the tube (1, 16, 20), the clamping means comprising two radially extending portions on the tube (1, 16, 20) and at least one fastener (8) for clamping the radially extending portions together, characterized in that the radially extending portions are side walls (6) of a fold (5, 17, 21) of the tube, the fold extending radially outwardly and having a portion closing the area between said radially extending portions from the outside.

2. An assembly according to claim 1, characterized in that the fold (5, 17, 21) extends to the ball joint shank end of the tube (1, 16, 20).

3. An assembly according to claim 2, characterized in that the tube (1) is a continuous shaped tube and forms a track or tie rod.

4. An assembly according to claim 1 or 2, characterized in that a pair of said tubes (1, 16) each with a performed fold (5, 17) are butt-welded in each case to the ends of an intermediate tubular member (12) with which they form in common a track or tie rod.

5. An assembly according to claim 1 or 2, characterized in that the ends of a tubular track or tie rod are formed, in each case, as a tube (20) with a performed fold (21).

6. An assembly according to claim 5, characterized in that an unformed intermediate tubular member (19) of the track or tie rod has a diameter which is greater than the diameter of the track or tie rod ends designed as tubes (20) with performed folds (21).

7. An assembly according to claim 5, characterized in that the radial extension of each fold (17, 21) increases toward a ball joint shank end of a particular tube (16, 20).

8. An assembly according to claim 3, characterized in that the inner threaded portions (2) at the ends of the track or tie rod have right and left threads, respectively.

9. An assembly according to one of claim 2, characterized in that the ball joint shank ends of each tube (1, 16, 20) and the open ends of each fold (5, 17, 21), are sealed by sealing rings (9, 14), preset or installed into tube expansions (11).

10. An assembly according to claim 9, characterized in that the sealing rings (9, 14) have tongues (10, 19) received in the folds (5, 17, 21), and that the fasteners (8) for securing of the ball joint shank, extend through bores in the tongues (10, 15).

11. An assembly especially for track and tie rods of motor vehicles, comprising a ball joint shank and a tube, said ball joint shank having an outer thread to be screwed into an inner threaded portion of said tube, said tube having a U-shaped portion extending radially of said inner threaded portion with the free ends of the legs of said U-shaped portion attached to said inner threaded portion and the base of said U-shaped portion closing the area between said legs of said U-shaped portion and spaced from said inner threaded portion, and at least one fastener for clamping said legs of said U-shaped portion to secure said ball joint shank to said inner threaded portion of said tube.

12. An assembly as defined in claim 11 wherein said inner threaded portion of said tube is seamless and closed over its circumferential extent.

* * * * *

UNITED STATES PATENT AND TRADEMARK OFFICE
CERTIFICATE OF CORRECTION

PATENT NO. : 4,902,158

DATED : February 20, 1990

INVENTOR(S) : Lothar Broszat, Andreas Merklinger, and Fritz Busse

It is certified that error appears in the above-identified patent and that said Letters Patent is hereby corrected as shown below:

Column 5, Line 22, Claim 9, delete "one of".

Signed and Sealed this

Twenty-seventh Day of November, 1990

Attest:

HARRY F. MANBECK, JR.

*Attesting Officer*

*Commissioner of Patents and Trademarks*